United States Patent

[11] 3,540,532

| [72] | Inventors | John A. Davis, Jr.;<br>William J. Kunzman, Littleton, Colorado |
|---|---|---|
| [21] | Appl. No. | 862,447 |
| [22] | Filed | Sept. 30, 1969<br>Continuation-in-part of Ser. No. 754,524,<br>July 22, 1968, now Pat. No. 3,500,912. |
| [45] | Patented | Nov. 17, 1970 |
| [73] | Assignee | Marathon Oil Company<br>Findlay, Ohio<br>a corporation of Ohio |

[54] HYDROPHOBICITY OF SURFACTANT INFLUENCING THE THERMOSTABILITY OF MICELLAR DISPERSIONS USED IN OIL RECOVERY
20 Claims, No Drawings

[52] U.S. Cl. ............ 166/252,
166/275, 252/8.55, 252/312
[51] Int. Cl. ............ E21b 43/22,
B01j 13/00
[50] Field of Search............ 166/252,
268, 274, 275, 273, 304, 305; 252/8, 55B, D, 308,
310, 312

[56] References Cited
UNITED STATES PATENTS

| 2,289,536 | 7/1942 | Bradley ............ | 252/312X |
| 3,117,929 | 1/1964 | McCoy et al. ............ | 252/312X |
| 3,254,714 | 6/1966 | Gogarty et al. ............ | 166/274 |
| 3,297,084 | 1/1967 | Gogarty et al. ............ | 166/274X |
| 3,330,343 | 7/1967 | Tosch et al. ............ | 166/273 |
| 3,330,344 | 7/1967 | Reisberg ............ | 166/274 |
| 3,476,184 | 11/1969 | Davis ............ | 166/273 |

Primary Examiner—Stephen J. Novosad
Attorneys—Joseph C. Herring, Richard C. Willson, Jr. and Jack L. Hummel

ABSTRACT: Thermostability range of micellar dispersions useful to recover crude oil in a secondary or a tertiary oil recovery process can be shifted to higher temperatures by increasing the hydrophobicity of the surfactant used to obtain the micellar dispersion. These dispersions are especially useful in flooding subterranean formations wherein the temperature is above 80°F.

3,540,532

HYDROPHOBICITY OF SURFACTANT INFLUENCING THE THERMOSTABILITY OF MICELLAR DISPERSIONS USED IN OIL RECOVERY

CROSS REFERENCES TO RELATED APPLICATIONS

This is a continuation-in-part of U.S. Pat. Ser. No. 754,524, filed July 22, 1968 now U.S. Pat. No. 3,500,912.

BACKGROUND OF THE INVENTION

U.S. Pat. No. 3,254,714 to Gogarty et al. teaches that micellar dispersions are useful in flooding subterranean oil-bearing formations to recover crude oil therefrom. These micellar dispersions are generally composed of a hydrocarbon, aqueous medium, and surfactant.

It is generally accepted within the petroleum industry that the normal temperature gradient of the subsurface is about 1°F. per 60 feet. Thus, at reservoir depths of about 4,000 feet, temperatures up to and above about 150°F. can be encountered. At such high temperatures, the micellar dispersion can become unstable, that is, exhibit a two-phase system, thus indicating emulsion characteristics.

Applicants have discovered that by increasing the hydrophobicity of surfactant within the micellar dispersion, the thermostability range of the dispersion can be shifted to higher temperatures. Thus, at temperatures in excess of 150°F., an otherwise unstable micellar dispersion, i.e. an emulsion, can be designed to be thermally stable. In addition, subterranean formations at temperatures exceeding 80°F. can be flooded efficiently with the teaching of this invention.

The term "thermostability" as used herein means thermodynamically stable, i.e. a system below or above the thermostability temperature range will exhibit two or more distinct layers or phases, indicating an unstable system or an emulsion.

DESCRIPTION OF THE INVENTION

The term "micellar dispersion" as used herein is meant to include "microemulsion" [Schulman and Montague, Annals of the New York Academy of Sciences, 92, pp 366—371,( 1961)], oleopathic hydromicelles [Hoar and Schulman, Nature, 152, p. 102 (1943)], "transparent" emulsions (Blair, Jr. et al., U.S. Pat. No. 2,356,205), and micellar solution technology taught in C. G. Sumner's, Clayton's, The Theory of Emulsions and Their Technical Treatment, 5th Edition, pp. 315—320 (1954) and micellar solutions. Examples of micellar solutions include those defined in U.S. Pat. Nos. 3,254,714; 3,275,075; 3,301,325; and 3,307,628.

The micellar dispersions are composed essentially of hydrocarbon, aqueous medium, and surfactant. Cosurfactant(s) and/or electrolyte(s) can also be incorporated into the micellar dispersion. Examples of volume amounts include 4-—60 percent or more hydrocarbon, less than 20—90 percent aqueous medium, at least about 4 percent surfactant, 0.01-—20 percent cosurfactant and 0.001—5 percent or more (weight percent based on aqueous medium) of electrolyte. The micellar dispersions can be oil-external or water-external.

Examples of hydrocarbon include crude oil (both sweet and sour) and partially refined fractions thereof, e.g., side cuts from crude columns, crude column overheads, gas oils, kerosene, heavy naphthas, naphthas, straight-run gasoline, and liquefied petroleum gases. Pure hydrocarbons are also useful, e.g. paraffin compounds including propane, pentane, heptane, decane, dodecane, etc.; cycloparaffinic compounds including cyclohexane, etc.; aryl compounds including monocyclic as well as polycyclic compounds, and substituted products thereof including toluene, alkyl phenols, etc. Based on economics, the preferred hydrocarbon is one locally available and is crude oil. The unsulfonated hydrocarbon (e.g. heavy vacuum gas oils) in petroleum sulfonates is also useful.

The aqueous medium can be soft water, brackish water, or brine water. Preferably, the water is soft but it can contain small amounts of salts which can be characteristic of the ions within the subterranean formation being flooded.

Surfactants useful with the dispersions include nonionic, cationic, and anionic surfactants. Examples of such surfactants include those found in U.S. Pat. No. 3,254,714 to Gogarty et al. Other useful surfactants include Duponol WAQE (a 30 percent active sodium lauryl sulfate marketed by DuPont Chemical Corporation, Wilmington, Delaware), Energetic W-100 (a polyoxyethylene alkyl phenol marketed by Armour Chemical Company, Chicago, Illinois), Triton X100 (an alkylphenoxy polyethoxy ethanol marketed by Rohm & Haas, Philadelphia, Pennsylvania) and Arquad 12-50 (a 50 percent active dodecyl trimethyl ammonium chloride marketed by Armour Chemical Company, Chicago, Illinois), and like materials. The surfactant can be low, medium, high or very high molecular weight surfactant—however, functional groups on the molecule can be used to impart the desired hydrophobicity. For example, an otherwise too oleophilic hydrocarbon molecule can have functional groups [including acidic groups (e.g. sulfonic, carboxylic, etc.) and salts thereof, hydroxy groups, amides, alkoxy groups, phosphorous containing groups, or like groups] incorporated thereon to obtain the desired level of hydrophobicity.

Preferably, the surfactant is a petroleum sulfonate, also known as alkyl aryl naphthenic sulfonate, and preferably containing a monovalent cation. Examples of preferred surfactants are the sodium and ammonium petroleum sulfonates having an average equivalent weight of from about 360 to about 520, and more preferably from about 420 to about 470. The surfactant can be a mixture of low and high average equivalent weight sulfonates or a mixture of two or more different surfactants.

Examples of useful cosurfactants, also known as cosolubilizers, and semipolar organic compounds, include alcohols, amino compounds, esters, aldehydes and ketones containing from one to about 1 to 20 or more carbon atoms and more preferably from about 3 to 16 carbon atoms. The cosurfactant is preferably an alcohol, e.g. isopropanol, n-and isobutanol, the amyl alcohols such as n-amyl alcohol, 1- and 2-hexanol, 1- and 2-octanol, decyl alcohols, alkaryl alcohols such as p-nonyl phenol, and alcoholic liquors such as fusel oil. Particularly useful alcohols include the primary butanols, primary pentanols, and primary and secondary hexanols. Concentrations of from about 0.01 percent to about 20 percent by volume of cosurfactant are useful in the micellar dispersion and more preferably from about 0.1 to about 5.0 percent. Mixtures of two or more cosurfactants are useful.

Electrolytes useful within the micellar dispersions include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in U.S. Pat. No. 3,330,343. The type and concentration of electrolyte will depend on the aqueous medium, surfactant, cosurfactant, hydrocarbon and the reservoir temperature. Generally from about 0.001 percent to about 4 percent or more, weight percent based on the aqueous medium, of electrolyte is useful. The electrolyte can be the salts within brackish or brine water.

The mobility of the micellar dispersion is desirably about equal to or less than the mobility of the formation fluids (i.e. combination of crude oil and interstitial water) flowing ahead of the dispersion. Preferably, the micellar solution has a mobility favorable to protecting against viscous instability.

Size of the micellar dispersion slug useful with this invention is preferably from about 1 percent to about 20 percent formation pore volume. Larger pore volumes are useful but such may be economically unattractive. More preferably, from about 2 percent to about 10 percent formation pore volumes are useful and from about 3 percent to about 6 percent formation pore volumes give very efficient oil recovery results.

The micellar dispersion is designed to be thermally stable at the temperature of the formation by increasing the hydrophobicity of the surfactant. The particular molecular weight required to stabilize the micellar dispersion at formation temperature can be determined by routine laboratory methods. In addition, the thermostability of the micellar dispersion will be secondarily dependent upon the particular hydrocarbon, the cosurfactant, the amount of electrolyte within the micellar dispersion, etc. A dispersion thermally stable at high temperatures may not necessarily be thermally stable at ambient temperatures.

The micellar dispersion should be compatible with the formation rock and the connate water within the formation. Thus, the components within the micellar dispersion will depend upon the particular reservoir being flooded.

The following examples are presented to specifically illustrate working embodiments of the invention. Such examples are not to be interpreted as limiting the invention, but equivalents known to those skilled in the art should be interpreted within the scope of the invention as defined by the specification and appended claims. Unless otherwise specified, percents are based on volume.

EXAMPLE I

Two micellar dispersions are obtained by mixing 60.9 percent crude column overhead, 4.8 percent isopropanol, 19.1 distilled water, and 15.2 percent sodium sulfonate [dispersion No. 1 has an average equivalent weight of about 430 and dispersion No. 2 an average equivalent weight of about 500,(the sulfonate in dispersion No. 2 is more hydrophobic) both sulfonates based on about 62 percent active sulfonate.] These two different micellar dispersions are tested for thermostability at lower and higher temperature limits (*i.e.* at temperatures below the lower temperature limit and at temperatures above the upper temperature limit, the fluid separates into two distinct layers or phases). Micellar dispersion No. 1 indicated a lower temperature limit of 54°F. and an upper temperature limit of 200°F. whereas micellar dispersion No. 2 indicated a lower temperature limit of 117°F. and an upper temperature limit of 200°F.+.

EXAMPLE II

Four micellar dispersion samples composed of 60.9 percent crude column overheads, 4.8 percent isopropanol, 19.1 percent distilled water, and 15.2 percent of a sodium petroleum sulfonate (composed of about 62 percent active sulfonate and having average equivalent weights indicated in table 1) for lower and upper temperature limits of thermostability. Test data are indicated in table 1:

TABLE 1

| Miscellar dispersion No. | Average equivalent weight | Thermostability range (° F.) | |
|---|---|---|---|
| | | Lower limit | Upper limit |
| 1 | 430 | 34 | 100 |
| 2 | 445 | 42 | 155 |
| 3 | 465 | 43 | 218 |
| 4 | 500 | 110 | 310 |

NOTE.—Surfactant within dispersions 1–4 increase in hydrophobicity with larger equivalent weights.

I claim:

1. A process of recovering crude oil from oil-bearing subterranean formations having at least one production means and at least one injection means in fluid communication therewith, the process comprising determining the temperature of the formation, injecting into and displacing through the formation a micellar dispersion comprised of hydrocarbon, aqueous medium, and surfactant(s) having a predetermined hydrophobicity to form a stable micellar dispersion at the formation temperature, said predetermined hydrophobicity being relatively low at low formation temperature and progressively greater at increasingly higher formation temperature.

2. The process of claim 1 wherein the mixture of micellar dispersion constituents contains cosurfactant.

3. The process of claim 1 wherein the formation temperature is in excess of about 80°F.

4. The process of claim 1 wherein the formation temperature is in excess of about 150°F.

5. The process of claim 1 wherein the formation temperature is in excess of about 200°F.

6. The process of claim 1 wherein the surfactant is a petroleum sulfonate.

7. The process of claim 1 wherein the average equivalent weight of the sulfonate is within the range of from about 360 to about 520.

8. The process of claim 1 wherein the mixture of micellar dispersion constituents contains electrolyte.

9. A process of recovering crude oil from an oil-bearing subterranean formation having at least one production means and at least one injection means in fluid communication therewith, comprising determining the temperature of the formation to be in excess of about 80°F., injecting and displacing through the formation a micellar dispersion comprised of hydrocarbon, aqueous medium, cosurfactant, and surfactant characterized in that the hydrophobicity of the surfactant is sufficient to stabilize the mixture of micellar dispersion constituents at the formation temperature.

10. The process of claim 9 wherein the mixture of micellar dispersion constituents contains electrolyte.

11. The process of claim 9 wherein the temperature of the formation is in excess of about 150°F.

12. The process of claim 9 wherein the temperature of the formation is in excess of about 200°F.

13. The process of claim 9 wherein the cosurfactant is an alcohol containing from one to about 20 carbon atoms.

14. The process of claim 9 wherein the surfactant is petroleum sulfonate.

15. A method of increasing the thermostability range of a micellar dispersion comprised of hydrocarbon, aqueous medium and surfactant to higher temperature ranges, the method comprising incorporating surfactant(s) having a predetermined hydrophobicity to form a stable micellar dispersion at the higher temperatures, said predetermined hydrophobicity being relatively low at low temperatures and progressively greater at increasingly higher temperatures.

16. The method of claim 15 wherein the surfactant is a petroleum sulfonate having an average equivalent weight within the range of from about 360 to about 520.

17. The method of claim 15 wherein the micellar dispersion contains cosurfactant.

18. The method of claim 17 wherein the cosurfactant is alcohol containing from one to about 20 carbon atoms.

19. The method of claim 15 wherein the micellar dispersion contains electrolyte.

20. A method of increasing the thermostability range of a micellar dispersion comprised of hydrocarbon, aqueous medium, and surfactant to higher temperature ranges, the method comprising choosing a surfactant having sufficiently high hydrophobicity to stabilize the dispersion at the higher temperature ranges and using this surfactant to obtain the dispersion.